Dec. 19, 1939.  J. H. DE FREES  2,183,987
VALVE OPERATING MECHANISM FOR TANK VEHICLES
Filed Feb. 7, 1938  2 Sheets-Sheet 1
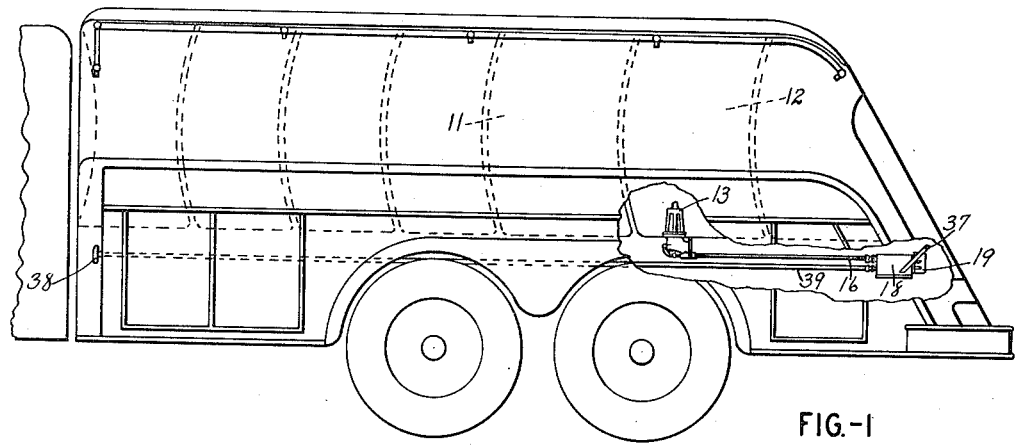
FIG.-1
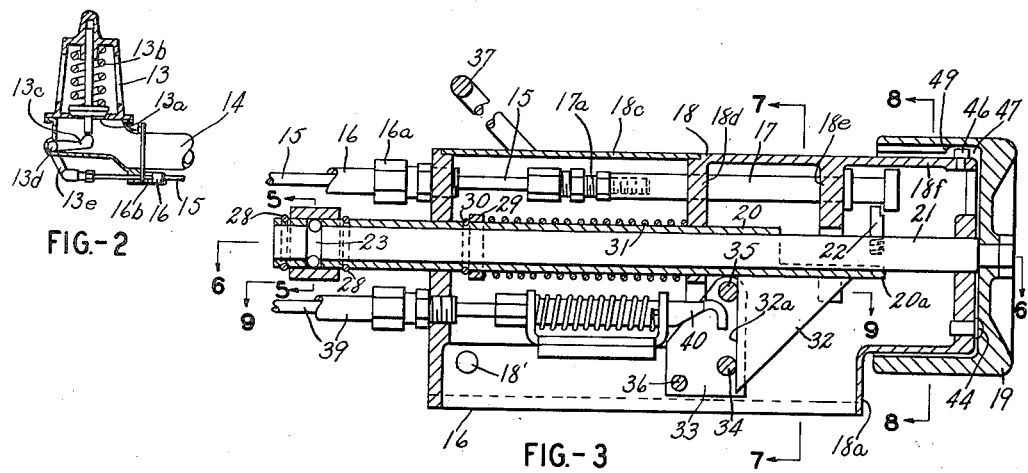
FIG.-2  FIG.-3
FIG.-5  FIG.-4
FIG.-11
INVENTOR
JOSEPH H. DE FREES
BY
Brockett, Hyde, Higby & Mayer
ATTORNEYS Dec. 19, 1939.     J. H. DE FREES     2,183,987
VALVE OPERATING MECHANISM FOR TANK VEHICLES
Filed Feb. 7, 1938     2 Sheets-Sheet 2

INVENTOR
JOSEPH H. DE FREES
BY
Brockett, Hyde, Higley & Meyer
ATTORNEYS

Patented Dec. 19, 1939

2,183,987

UNITED STATES PATENT OFFICE 2,183,987

VALVE OPERATING MECHANISM FOR TANK VEHICLES

Joseph H. De Frees, Warren, Pa., assignor to Pennsylvania Furnace and Iron Company, Warren, Pa., a corporation of Pennsylvania Application February 7, 1938, Serial No. 189,094

6 Claims. (Cl. 137—21)

This invention relates to improvements in valve operating mechanism for tank vehicles, and especially to multiple valve operating mechanism for a tank vehicle having a plurality of compartments.

One of the objects of the present invention is to provide in a tank vehicle having a plurality of compartments with a valved outlet for each compartment, a compact, simple and foolproof control device for said valves.

Another object of the present invention is to provide a control mechanism for a plurality of valves as mentioned above, so arranged that but one valve in one compartment may be opened at one time.

Another object of the present invention is to provide a novel arrangement of parts whereby one of a plurality of valve actuators may first be selected and then moved in valve opening direction and held in valve-open position. Such an arrangement may include means for preventing the valve opening movement of the actuator except when one certain actuator has been properly engaged by the selector mechanism.

Another object of the present invention is to provide a remotely controlled trip mechanism for releasing an open valve, this trip mechanism being normally immobile as the valves are opened and closed but being in operative position when a valve is opened so that a pull on the trip from a remote point will release the holding means and cause the valve to close.

Another object of the present invention is to provide a novel fusible connection between a valve actuator and the means for holding the valve in open position so that upon fusing of the connection due to accidental fire, the valve will automatically close.

Another object of the present invention is to provide valve control mechanism located remotely from the valve controlled, wherein the valve actuating mechanism is entirely enclosed from the valve to the control point and so enclosed at the control point that the valves may be operated solely by the substantially foolproof mechanism provided therefor.

My invention also includes a novel arrangement of many of the parts for carrying out the aforesaid purposes and the essential features will be summarized in the claims.

Figure 6:
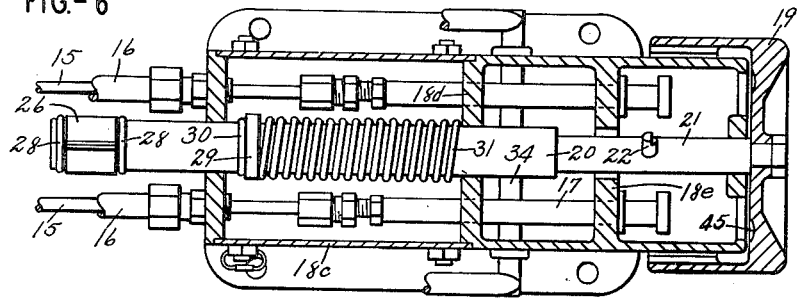
Figure 7:
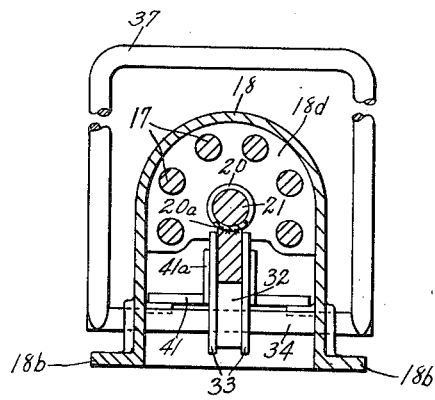
Figure 8:
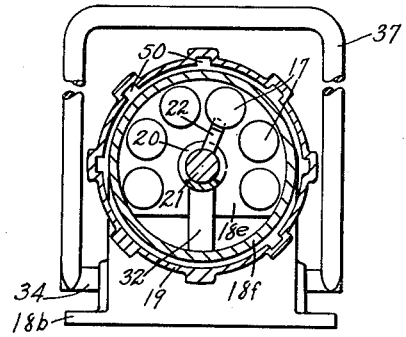
Figure 9:
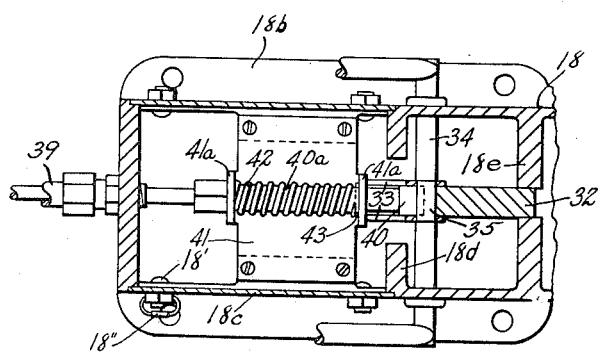
Figure 10:
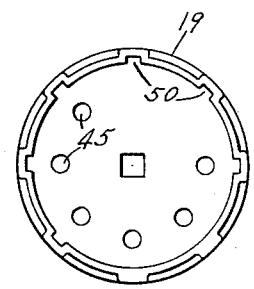

In the drawings, Fig. 1 is a partial side elevation of a tank truck equipped with my novel valve control mechanism; Fig. 2 is an enlarged sectional view of a compartment outlet valve of Fig. 1; Figs. 3 and 4 are longitudinal sectional views, enlarged, of the valve control unit located at the rear of the truck of Fig. 1; Fig. 4 showing the parts of Fig. 3 in operated position; Fig. 5 is a sectional view along the line 5—5 of Fig. 3, showing the fusible connection; Fig. 6 is a horizontal sectional view taken along the line 6—6 of Fig. 3; Figs. 7 and 8 are transverse sectional views taken along similarly numbered lines of Fig. 3; Fig. 9 is a partial sectional view taken along the line 9—9 of Fig. 3; while Fig. 10 is an end view of the selector cap of Figs. 3, 4 and 6 taken from approximately the position 10—10 of Fig. 4; and Fig. 11 is a section along the line 11—11 of Fig. 4.

While my invention is capable of many applications, I have illustrated the same in Fig. 1 as applied to a tank truck such as is used in the transportation of gasoline, oil and the like. This truck is provided with a plurality of liquid compartments 11, 12, etc., each having a valve 13 at the bottom thereof which may be of any suitable type, one such valve being shown in Fig. 2. This valve is of the type having a disk seat coacting with an opening 13a in the bottom of the compartment and normally moved in valve closing direction by the spring 13b. A cam arm 13c is rigid with a shaft 13d which carries an arm 13e so that upon movement of the arm 13c in a counterclockwise direction as viewed in Fig. 2, the valve will be opened against the action of its spring. Liquid will then flow through a suitable conduit 14 to the rear end of the tank where suitable manifolds, control valves, meters, etc., are normally supplied. The present invention is not concerned with the details of these liquid outlet conduits and further description of the same is therefore unnecessary. Each arm 13e is provided with a cable 15 extending to that point on the truck where the valve selector and actuating mechanism is located. Each such cable is housed in a tube or armature 16 which in the usual manner is rigidly connected with parts of the truck body as at the points 16a and 16b so that each cable 15 is protected from the weather and is also covered so it may not be tampered with or manually actuated.

Each of the cables 15 at its rear end is provided with a pull rod or actuator 17, all of these actuators ending in a common line so that a selector may be moved along the line to pick out any one actuator for a valve opening operation. In the present instance these actuators end in a curved line and more specifically they are arranged in spaced relation about an arc of a circle as best seen in Figs. 7 and 8. All of these actuators and the mechanism other than the operating handle are housed in a casing 18 which is substantially closed or at least so arranged that the actuators may be operated only by the operating handle provided. While I have shown this casing located at the rear of the truck, it will be understood that it may be located at any selected point on the vehicle.

By arranging the actuators 17 in a small circle as shown I am enabled to provide a very compact operating mechanism housed entirely within the comparatively small casing 18. This takes up very little room and weight, thus giving more room on the truck for pay load. In the form shown the housing comprises a main portion 18a having at its bottom portion laterally extending flanges 18b by which the casing may be secured to the truck. A U-shaped removable cover portion 18c is provided at the forward part of the casing, the removal of which gives access to the length adjusting means 17a where each actuator is connected to its cable 15. This cover member may be removably secured in place in any suitable manner, and preferably is also sealed, such as by applying to one or more of the securing bolts 18' an ordinary lead seal 18'' to prevent surreptitious removal of cover 18c. This discourages opening of a valve to an empty tank compartment while liquid is being withdrawn through a valve selected by finger 22, which practice would permit an operator to pass air through a metering device and thereby produce a false measure. In the interior of the casing are webs 18d and 18e for supporting parts of the actuating mechanism. The casing also has at its rear end a sleeve portion 18f which coacts with the selector cap 19.

Located concentrically of the circle formed by the actuators 17 is a sleeve 20 reciprocably mounted in the casing web 18d and in the front end wall of the casing. Slidably and rotatably mounted within the sleeve 20 is the operator rod 21 which carries a selector finger 22 adapted upon rotation of rod 21 to engage a selected actuator 17.

I provide a novel fusible connection between the sleeve 20 and the rod 21. This is best seen in Figs. 3, 4 and 5. In rod 21 is an annular groove 23. In the sleeve 20 are drilled openings 24. Balls 25 fit partly in the groove 23 and partly in the holes 24 but are adapted to pass through the holes 24. These balls are held in position by semicircular metallic bands 26 which are provided with meeting flanges connected together by a fusible solder at the points 27. The bands 26 are held in position longitudinally of snap rings 28. It results from this construction that if a fire occurs at the rear of the vehicle the heat will melt the fusible solder at the points 27 loosening the bands 26 so that they will fall away or will be forced away by balls 25 as the latter are squeezed out of their groove 23, whereupon the balls 25 will pass through the holes 24 thus permitting relative longitudinal movement between sleeve 20 and rod 21.

On sleeve 20 is fixed a collar 29 in any suitable manner as by the snap ring 30 and between that collar and the web 18d is provided a coil spring 31 which normally urges sleeve 20 toward the left as viewed in Figs. 3, 4 and 6 and of course if rod 21 is connected with the sleeve 20 then the spring 31 will also urge rod 21 toward the left.

Means is provided for moving rod 21 and selector finger 22 longitudinally of the casing to move a selected actuator into valve opening position and for holding it there. This means comprises the projection 32 extending downwardly from the sleeve 20. In the form shown the sleeve 20 has a rearwardly projecting lip 20a and the triangular piece 32 is secured to the sleeve and to this lip in a suitable manner as for instance by welding. A crank 33 is rigidly fixed on shaft 34 which is rotatably mounted in the side walls of casing 18. In the form shown this crank comprises a pair of side plates which carry between them pins 35 and 36. Pin 35 bears against the perpendicular forward face 32a of cam 32 so that upon oscillation of the crank about the point 34 the pin 35 carries the cam 32 rearwardly from the position of Fig. 3 to that of Fig. 4. The function of pin 36 is to coact with a remotely controlled trip mechanism as will presently appear. It will be noted that the two side plates of crank 33 always engage opposite lateral faces of the cam 32 as best seen in Figs. 3, 4 and 7. This holds sleeve 20 against rotation. Means is provided for oscillating shaft 34 and crank 33. This means comprises a handle or bail 37 on the outside of the casing which is rigidly connected to the ends of shaft 34. Referring to Fig. 4, it will be noted that spring 31 tends to move sleeve 20 toward the left and hence causes cam 32 to press against pin 35 toward the left. Also it will be recalled that the valve which is held open by actuator 17 has a spring 13b under tension which is tending to move the finger 22 and hence rod 21, sleeve 20 and cam 32 toward the left also pressing against pin 35. It will be noted in Fig. 4 that pin 35 is below shaft 34. In other words this pin 35 has moved over dead center and the pin 35 and crank 33 will tend to remain in the position of Fig. 4 until they are positively moved to valve release position. The usual means for release will be the bail 37. An alternative form of release is the fusible connection shown at the left end of sleeve 20 and rod 21 which has already been described. Upon release of this fusible connection the sleeve 20 will remain in the position of Fig. 4 but the rod 21 will then be free to move toward the left and actuator 17 will also move toward the left as spring 13b closes the valve 13 which was held open.

A remote controlled trip means is provided for causing the closing of an open valve from some point on the vehicle body remote from the control mechanism in casing 18. This is generally located at the side or front of the truck and in the present instance I have shown a control knob or button 38 located toward the front of the truck and connected by an armored cable 39 to a hook member 40 which is adapted to overlie pin 36 in the position of Fig. 4. This hook member has a shank 40a which is reciprocably mounted in the ears 41a of a bracket 41 which extends from side to side of the casing frame. A spring 42 lies between the forwardmost ear 41a and a pin 43 in the shank 40a. The spring 42 therefore always tends to return the hook 40 to its rearmost position. It will be noted with reference to Figs. 3 and 4 that when crank 33 is oscillated to actuate a valve ordinarily no movement takes place with regard to the hook 40. The pin 36 simply moves idly from the position of Fig. 3 to that of Fig. 4 and then back again. However, with a valve held in open position as shown in Fig. 4, in an emergency a pull on the knob 38 will move hook 40 to the left as shown in Fig. 4 causing an oscillation of crank 33 in a counterclockwise direction so as to release the projection 32 and to permit an open valve to close.

Means is provided for rotating rod 21 and finger 22 so as to select a desired valve for opening. To this end the cap 19 is secured to the end of rod 21 and rotates about the casing sleeve portion 18f. Means is provided to inform the operator when the selector finger is in proper engagement with one of the actuators 17. To this end a button 44 is fixed in the rear end of casing 18 and the inner face of the head of the selector cap member 19 is provided with a series of depressions 45 so that the operator may feel when the button 44 engages in one of the recesses 45. Means is also provided preferably to prevent longitudinal valve opening movement of rod 21 except when finger 22 is in proper selective engagement with one of the actuators 17. To this end a pin 46 is secured in the end of sleeve 18f and an annular recess 47 is provided in the interior wall of cap 19 permitting rotation of the cap about sleeve 18f to select the desired valve actuator. A shoulder 49 is provided with spaced slots 50 adapted to pass the pin 46. Referring to Fig. 8, the spacing of the slots is such that when pin 46 registers with one of the slots 50, the finger 22 is in proper operative relationship with one of the actuators 17. I prefer to arrange the notches in the ends of actuators 17 and the circumferential width of finger 22 in such a manner that this finger is never out of engagement with the notches in the actuators. This prevents a misplacing of the parts. However two actuators cannot be operated together because of the registration necessary between pin 46 and one of the slots 50.

In the form shown, the casing 18 is open at the bottom 16 and may be closed by a plate or by the part of the frame upon which the casing 18 is fastened if desired. However the arrangement of the parts is such that the actuators 17 cannot be operated except by the mechanism extending outside of the casing for that purpose.

What I claim is:

1. In valve actuating mechanism of the class described, a plurality of pull rods each operatively associated with a valve, said pull rods being mounted for longitudinal movement in an elongated casing, said pull rods being spaced about an arc of a circle, an operator rod concentric of said circle rotatable and movable longitudinally, a finger rigid with said operator rod and movable by rod rotation into engagement with said pull rods, said finger engaging one pull rod before losing engagement with the adjacent pull rod, and means preventing longitudinal movement of said operator rod except when said finger is in full engagement with one pull rod only.

2. Valve actuating mechanism of the class described comprising a plurality of pull rods each operatively associated with a valve, said pull rods being mounted for longitudinal movement in an elongated casing, said pull rods being spaced about an arc of a circle, a sleeve concentric with said circle and movable longitudinally of said casing, an operator rod slidable in said sleeve, a fusible connection between said operator rod and sleeve, a selector finger rigid with said operator rod and movable by rod rotation into engagement with one of said pull rods, means preventing longitudinal valve opening movement of said operator rod and finger except when said finger engages one of said pull rods, holding means adapted upon movement to engage a portion of said sleeve whereby to move the latter longitudinally into valve opening position and to hold it there, handle means for moving said holding means, remotely operable trip means for moving said holding means out of holding position, and means for closing each valve when released from its holding means.

3. In a tank vehicle having a plurality of compartments and an outlet for each compartment, a valve for each outlet, control mechanism for said valves comprising an actuator for each valve, said actuators lying in a common plane and being grouped in a small circle, selector means having a part movable in an arc for selecting and engaging one of said actuators, said selector means being movable normal to the plane of said circle for causing valve opening movement of the selected actuator, holding means for moving said selector means to valve opening position and for holding it there, and remotely operable trip means for moving said holding means out of holding position to permit the selected valve to close.

4. In a tank vehicle having a plurality of compartments and an outlet for each compartment, a valve for each outlet, control mechanism for said valves comprising an actuator for each valve, said actuators lying in a common plane and being grouped in an arc, a casing housing said actuators, a rod mounted axially of said arc for rotation in said casing, a finger on said rod movable by rod rotation to a position adapted to engage a selected one of said actuators, a selector cap rigid with said rod and positioned outside said casing, said cap and rod being mounted for movement relatve to said casing normal to the plaine of said arc to move an actuator to valve opening position, there being means on said cap and casing coacting to prevent relative valve-opening movement between them except when said finger is in position to engage an actuator and to prevent rotation of said cap when said cap and rod are in position holding a selected valve open, and means for moving said cap and rod to pull upon a selected actuator to move a valve to open position and for so holding them.

5. In a tank vehicle having a plurality of compartments and an outlet for each compartment, a valve for each outlet, control mechanism for said valves comprising an actuator for each valve, said actuators lying in a common plane and being grouped in a small circle, selector means having a part movable in an arc for selecting and engaging one of said actuators, said selector means being movable normal to the plane of said circle for causing valve opening movement of the selected actuator, a part engageable with a portion of said selector means and movable normal to the plane of said circle to so move said selector means, and said part being movable to an over-center position for holding said selector means in valve-opening position.

6. In a tank vehicle having a plurality of compartments and an outlet for each compartment, a valve for each outlet, control mechanism for said valves comprising an actuator for each valve, said actuators lying in a common plane and being grouped in an arc, a casing housing said actuators, a sleeve member mounted axially of said arc, a rod member slidable longitudinally in said sleeve member, one of said members being operatively connected with a valve actuator and the other of said members being operatively connected with means for holding said valve open, and connecting means between said members comprising an annular groove in said rod, there being an opening through said sleeve opposite said groove, a ball lying partly in said groove and partly in said opening and adapted to pass through the latter, a collar preventing movement of said ball through said opening, and fusible means holding said collar in position.

JOSEPH H. DE FREES.